(12) United States Patent
Foster (10) Patent No.: US 10,100,746 B2
(45) Date of Patent: Oct. 16, 2018

(54) CONTROLLER, FOR USE IN A POWER PLANT HAVING A LIQUID COOLING SYSTEM AND AN AIR COOLING SYSTEM

(75) Inventor: Peter Freerick William Foster, Staffordshire (GB)

(73) Assignee: ROLLS-ROYCE plc, London (GB)

( * ) Notice: Subject to any disclaimer, the term of this patent is extended or adjusted under 35 U.S.C. 154(b) by 1332 days.

(21) Appl. No.: 13/461,325

(22) Filed: May 1, 2012

(65) Prior Publication Data

US 2012/0285402 A1    Nov. 15, 2012

(30) Foreign Application Priority Data

May 10, 2011   (GB) .................................. 1107701.3

(51) Int. Cl.
| | |
|---|---|
| F02C 9/16 | (2006.01) |
| F01D 17/02 | (2006.01) |
| F01D 17/20 | (2006.01) |
| F01D 25/08 | (2006.01) |
| F01D 25/12 | (2006.01) |
| F02C 7/12 | (2006.01) |
| F02C 7/18 | (2006.01) |
| F02C 9/18 | (2006.01) |

(52) U.S. Cl.
CPC ................ *F02C 9/16* (2013.01); *F01D 17/02* (2013.01); *F01D 17/20* (2013.01); *F01D 25/08* (2013.01); *F01D 25/12* (2013.01); *F02C 7/12* (2013.01); *F02C 7/185* (2013.01); *F02C 9/18* (2013.01)

(58) Field of Classification Search
CPC .... F02C 9/16; F02C 9/18; F02C 7/185; F02C 7/12; F01D 17/02; F01D 25/12; F01D 25/08; F01D 17/20
USPC .................................................... 123/41.12
See application file for complete search history.

(56) References Cited

U.S. PATENT DOCUMENTS

| | | | | |
|---|---|---|---|---|
| 3,083,532 | A  * | 4/1963 | Cook .............................. | 60/728 |
| 6,135,760 | A  * | 10/2000 | Cusack et al. ................. | 431/79 |
| 6,271,766 | B1 * | 8/2001 | Didden et al. ............. | 340/853.1 |
| 6,355,186 | B1 * | 3/2002 | Shimomura et al. .......... | 252/68 |
| 6,357,217 | B1 * | 3/2002 | Griffin ........................... | 60/780 |
| 6,578,362 | B1 | 6/2003 | Coffinberry | |
| 6,584,778 | B1 * | 7/2003 | Griffiths et al. ............... | 60/782 |

(Continued)

FOREIGN PATENT DOCUMENTS

| | | |
|---|---|---|
| EP | 1 154 135 A2 | 11/2001 |
| EP | 1 154 136 A2 | 11/2001 |

(Continued)

OTHER PUBLICATIONS

Sep. 8, 2011 Search Report issued in British Patent Application No. 1107701.3.

(Continued)

*Primary Examiner* — Jacob Amick
*Assistant Examiner* — Charles Brauch
(74) *Attorney, Agent, or Firm* — Oliff PLC (57) ABSTRACT

A controller, for use in a power plant having a liquid cooling system and an air cooling system, comprising one or more inputs, configured to receive a signal from at least one deposit sensor, wherein the signal from the deposit sensor is indicative of deposits in the liquid cooling system; and one or more processors, configured to process the signal received from the deposit sensor to control the air cooling system.

21 Claims, 8 Drawing Sheets

(56) References Cited

U.S. PATENT DOCUMENTS

| | | | |
|---|---|---|---|
| 2004/0060344 A1* | 4/2004 | Kauffman et al. | 73/53.01 |
| 2004/0194497 A1* | 10/2004 | Sasaki et al. | 62/505 |
| 2005/0220331 A1* | 10/2005 | Kychakoff et al. | 382/141 |
| 2005/0258409 A1* | 11/2005 | Raynor | 254/126 |
| 2008/0016971 A1 | 1/2008 | Bunce et al. | |
| 2008/0264148 A1* | 10/2008 | Bulst et al. | 73/29.01 |
| 2010/0006256 A1* | 1/2010 | Kuwano et al. | 165/47 |
| 2010/0068983 A1* | 3/2010 | Williams | 454/184 |
| 2010/0115913 A1* | 5/2010 | Bondarenko et al. | 60/39.465 |

FOREIGN PATENT DOCUMENTS

| | | | |
|---|---|---|---|
| GB | 694715 A | | 7/1953 |
| JP | 2009158349 A | * | 7/2009 |
| WO | 2011/012917 A1 | | 2/2011 |

OTHER PUBLICATIONS

Jan. 24, 2018 Search Report issued in European Patent Application No. 12166283.

* cited by examiner

CONTROLLER, FOR USE IN A POWER PLANT HAVING A LIQUID COOLING SYSTEM AND AN AIR COOLING SYSTEM

FIELD OF THE INVENTION

Embodiments of the present invention relate to a controller, for use in a power plant having a liquid cooling system and an air cooling system.

BACKGROUND TO THE INVENTION

Some power plants comprise an engine, a liquid cooling system for cooling the engine, and an air cooling system for cooling the liquid of the liquid cooling system.

BRIEF DESCRIPTION OF VARIOUS EMBODIMENTS OF THE INVENTION

Some embodiments of the present invention provide for an adaptive control system for a cooling system of a power plant.

According to various, but not necessarily all, embodiments of the invention there is provided a controller, for use in a power plant having a liquid cooling system and an air cooling system, comprising:
 one or more inputs, configured to receive a signal from at least one deposit sensor, wherein the signal from the deposit sensor is indicative of deposits in the liquid cooling system; and
 one or more processors, configured to process the signal received from the deposit sensor to control the air cooling system.

According to various, but not necessarily all, embodiments of the invention there is provided a gas turbine power plant, comprising a controller as described above.

According to various, but not necessarily all, embodiments of the invention there is provided a power plant comprising:
 a liquid cooling system;
 an air cooling system;
 at least one deposit sensor configured to transmit a signal that is indicative of deposits in the liquid cooling system; and
 control circuitry configured to process a signal received from the deposit sensor to control the air cooling system.

According to various, but not necessarily all, embodiments of the invention there is provided a method of cooling a power plant comprising:
 receiving a signal indicative of deposits in a liquid cooling system of the power plant; and
 controlling an air cooling system of the power plant in dependence upon the received signal.

According to various, but not necessarily all, embodiments of the invention there is provided a computer program, that when executed by a processor performs the method described above.

According to various, but not necessarily all, embodiments of the invention there is provided a controller, for use in a power plant having a liquid cooling system and an air cooling system, comprising:
 input means for receiving a signal from at least one deposit sensor, wherein the signal from the deposit sensor is indicative of deposits in the liquid cooling system; and
 processing means for processing the signal received from the deposit sensor to control the air cooling system.

According to various, but not necessarily all, embodiments of the invention there is provided a power plant comprising:
 liquid cooling means;
 air cooling means;
 sensing means for transmitting a signal that is indicative of deposits in the liquid cooling means; and
 control means for processing a signal received from the sensing means to control the air cooling means.

According to various, but not necessarily all, embodiments of the invention there is provided a controller, a gas turbine power plant, a power plant, a method or a computer program as described in the appended claims.

BRIEF DESCRIPTION OF THE DRAWINGS

For a better understanding of various examples of embodiments of the present invention reference will now be made by way of example only to the accompanying drawings in which.

DETAILED DESCRIPTION OF VARIOUS EMBODIMENTS OF THE INVENTION

The Figures illustrate a controller 2, for use in a power plant 4 having a liquid cooling system 6 and an air cooling system 8, comprising one or more inputs 10, configured to receive a signal 12 from at least one deposit sensor 14, wherein the signal 12 from the deposit sensor 14 is indicative of deposits 40 in the liquid cooling system 6; and one or more processors 16, configured to process the signal 12 received from the deposit sensor 14 to control the air cooling system 8.

Figure 1:
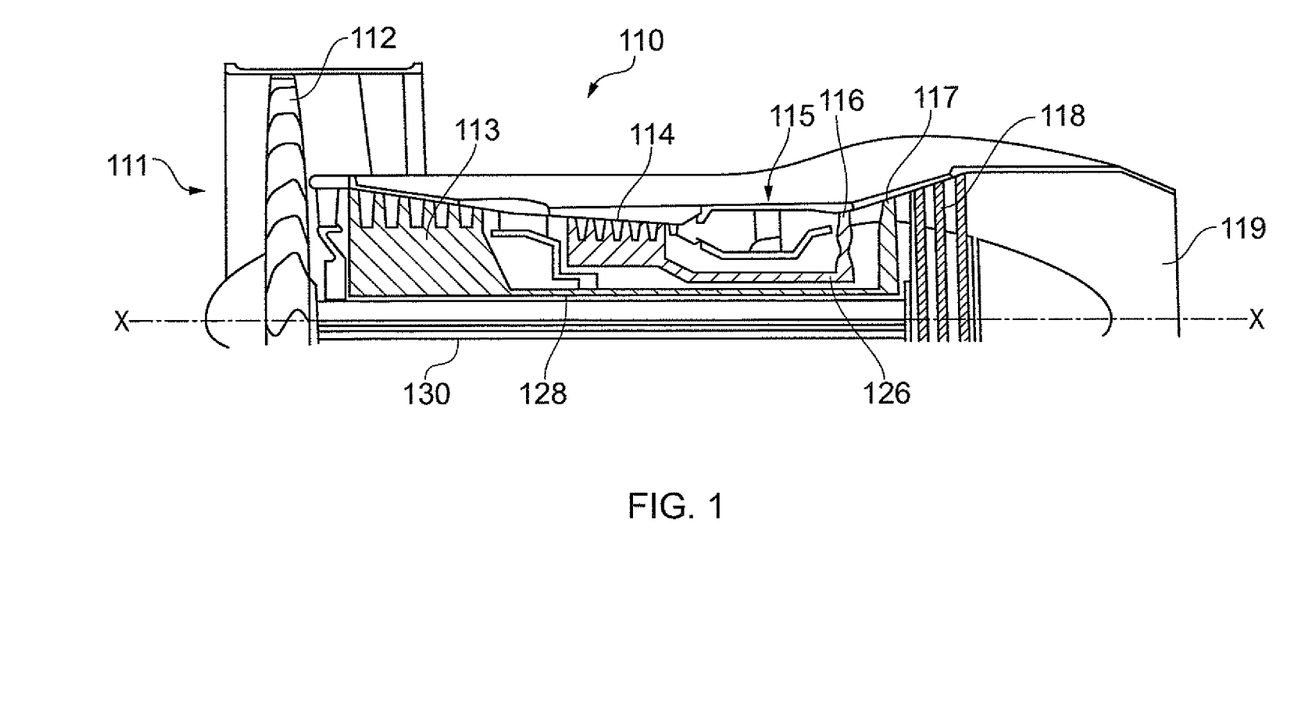
FIG. 1 illustrates, in cross section, an example of a gas turbine engine.

Referring to FIG. 1, a gas turbine engine is generally indicated at 110 and comprises, in axial flow series, an air intake 111, a propulsive fan 112, an intermediate pressure compressor 113, a high pressure compressor 114, a combustor 115, a turbine arrangement comprising a high pressure turbine 116, an intermediate pressure turbine 117 and a low pressure turbine 118, and an exhaust nozzle 119.

The gas turbine engine 110 operates in a conventional manner so that air entering the intake 111 is accelerated by the fan 112 which produces two air flows: a first air flow into the intermediate pressure compressor 113 and a second air flow which provides propulsive thrust. The intermediate pressure compressor compresses the air flow directed into it before delivering that air to the high pressure compressor 114 where further compression takes place.

The compressed air exhausted from the high pressure compressor 114 is directed into the combustor 115 where it is mixed with fuel and the mixture combusted. The resultant hot combustion products then expand through, and thereby drive, the high, intermediate and low pressure turbines 116, 117 and 118 before being exhausted through the nozzle 119 to provide additional propulsive thrust. The high, intermediate and low pressure turbines 116, 117 and 118 respectively drive the high and intermediate pressure compressors 114 and 113 and the fan 112 by suitable interconnecting shafts 126, 128, 130.

Figure 2:
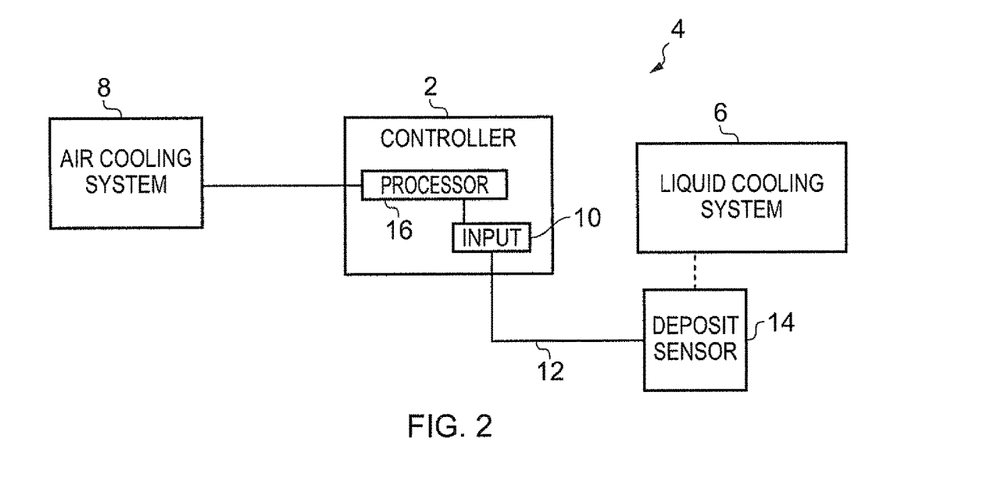
FIG. 2 illustrates a schematic example of at least part of a power plant.

FIG. 2 illustrates a schematic example of at least part of a power plant 4. In use a controller 2 controls one or more systems of the power plant 4. The power plant 4 may be, for example, a gas turbine. For example the power plant 4 may be a gas turbine engine 110 as illustrated in the example shown in FIG. 1 and the controller 2 may be an Engine Electronic Controller, EEC.

The power plant 4 also comprises a liquid cooling system 6, a deposit sensor 14 and an air cooling system 8. The power plant 4 may have any number of further elements, such as further cooling systems or deposit sensors, not illustrated in FIG. 2 for the sake of clarity.

The controller 2 comprises control circuitry, for example one or more processors 16 as illustrated in FIG. 2, and one or more inputs 10. As used in this application, the term 'circuitry' refers to hardware-only circuit implementations and to combinations of circuits and software (and/or firmware). As used in this application the term 'circuitry' also refers to circuits, such as a microprocessor(s) or a portion of a microprocessor(s), that require software or firmware for operation, even if the software or firmware is not physically present.

In the example illustrated in FIG. 2 only a single processor 16 and input 10 have been included for the sake of clarity. The one or more inputs are communicatively coupled to the one or more processors 16. The one or more inputs 10 may be directly coupled to the one or more processors 16 or there may be any number of intervening elements between the one or more inputs 10 and the one or more processors 16.

Figure 5A:
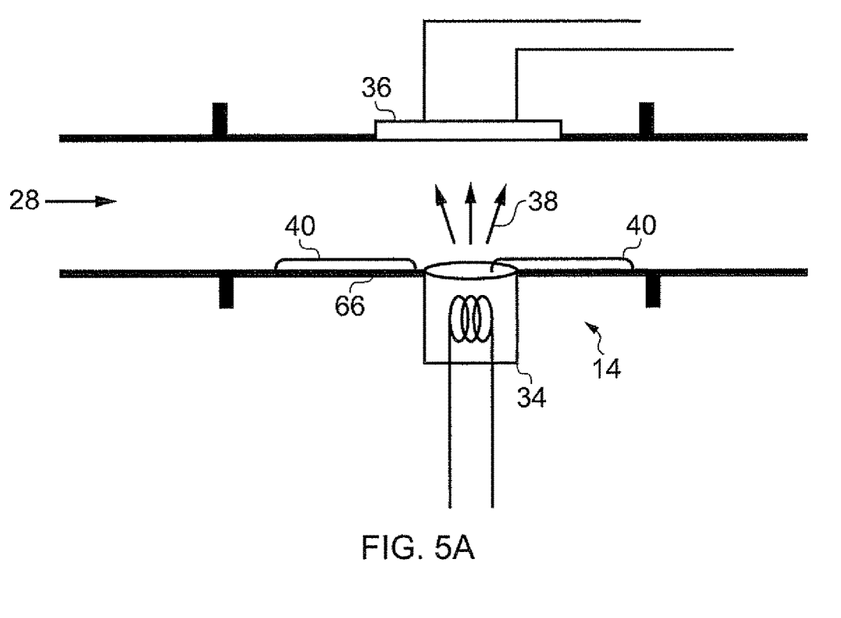
FIG. 5A illustrates an example of a deposit sensor.

The deposit sensor 14 is located in the power plant 4 such that the deposit sensor is configured to transmit a signal 12 that is indicative of deposits 40 in the liquid cooling system 6 to the controller 2, as illustrated in FIG. 5A. For example, the signal 12 may vary with an amount of deposits 40 in the liquid cooling system 6 and/or the signal 12 may vary with a rate of deposition of deposits 40 in the liquid cooling system 6.

Figure 3:
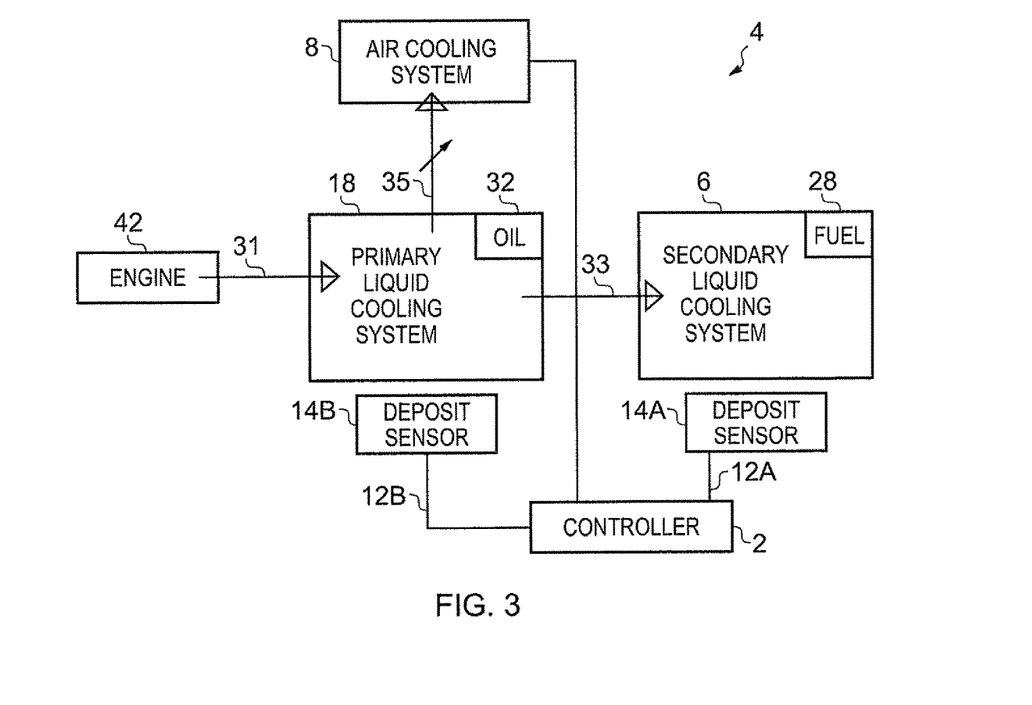
FIG. 3 illustrates a further schematic example of at least part of a power plant.

The liquid in the liquid cooling system 6 may, for example, be substantially comprised of oil 32 or fuel 28 for the power plant, as illustrated in FIG. 3.

The one or more inputs 10 of the controller 2 are configured to receive the signal 12 from the deposit sensor 14. The one or more processors 16 of the controller 2 are configured to process the received signal 12 from the deposit sensor 10 to control the air cooling system 8. That is, the one or more processors 16 of the controller 2 are configured to control the air cooling system 8 in dependence upon the amount of deposits 40 and/or the rate of deposition of deposits 40 in the liquid cooling system 6 as indicated by the signal 12 received from the deposit sensor 14.

FIG. 3 illustrates a schematic example similar to the one illustrated in FIG. 2 as described above. However, in FIG. 3 the control circuitry, for example one or more processors 16, and the one or more inputs 10 of the controller 2 are not illustrated.

In FIG. 3 the power plant 4 comprises a primary liquid cooling system 18 and a secondary liquid cooling system 6. The power plant of FIG. 3 also comprises a deposit sensor 14A, a further deposit sensor 14B and an engine 42.

In the example illustrated in FIG. 3 the liquid in the primary liquid cooling system 18 is comprised substantially of oil 32 and the liquid in the secondary liquid cooling system 6 is comprised substantially of fuel 28. The fuel 28 is for the engine 42, as indicated in FIG. 3 by the line connecting the secondary liquid cooling system 6 and the engine 42.

The deposit sensor 14A is located such that the deposit sensor 14A is configured to transmit a signal 12A that varies with an amount of deposits 40 and/or a rate of deposition of deposits 40 in the secondary liquid cooling system 6. The further deposit sensor 14B is located such that the further deposit sensor 14B is configured to transmit a signal 12B that varies with an amount of deposits 40 and/or a rate of deposition of deposits 40 in the primary liquid cooling system 40.

The one or more inputs 10 of the controller 2 are configured to receive the signal 12A 12B from the deposit sensor 14A and/or the further deposit sensor 14B. The control circuitry of the controller 2 is configured to process the signal 12A 12B received from the deposit sensor 14A and/or the further deposit sensor 14B to control the air cooling system 8.

The arrows 31, 33, 35 in FIG. 3 illustrate the flow of heat through the power plant 4. In the illustrated example, heat is transferred from the engine 42 to the primary liquid cooling system 18 and from the primary liquid cooling system 18 to the secondary liquid cooling system 6. A variable amount of heat is transferred from the primary liquid cooling system 18 to the air cooling system 8.

Therefore, in embodiments the primary liquid cooling system 18 is used to cool the engine 42 and the secondary liquid cooling system 6 is used to cool the primary liquid cooling system 18. The air cooling system 8 is also used to cool the primary liquid cooling system 18 by a variable amount.

The amount of heat dissipated from the oil 32 of the primary liquid cooling system 18 to the fuel 28 of the secondary liquid cooling system 6 is carefully managed to avoid overheating the fuel 28.

If the fuel 28 is overheated this may result in thermal degradation of the fuel 28 and the formation and deposition of deposits 40, for example insoluble lacquers and gums, in the secondary liquid cooling system 6. This may result in malfunction of the fuel system of the power plant 4.

To avoid overheating of the secondary liquid cooling system 6 the air cooling system 8 is also used to cool the primary liquid cooling system 18 by a variable amount. The amount of cooling provided by the air cooling system is controlled by the controller 2.

The control circuitry of the controller 2 is configured to control the amount of cooling of the primary liquid cooling system 18 provided by the air cooling system 8 in dependence upon the signal 12A received from the deposit sensor 14A.

For example, if the signal 12A received from the deposit sensor 14A indicates that the amount of deposits 40 and/or the rate of deposition of deposits 40 in the secondary liquid cooling system 6 is greater than expected this may indicate that the fuel 28 is being overheated.

The control circuitry may therefore control the air cooling system 8 to increase the amount of heat transferred from the primary liquid cooling system 18 to the air cooling system 8 thus increasing the amount of cooling provided by the air cooling system 8.

As another example, if the signal 12A received from the deposit sensor 14A indicates that the amount of deposits 40 and/or the rate of deposition of deposits 40 in the secondary liquid cooling system is less than expected the control circuitry may decrease the amount of heat transferred from the primary liquid cooling system 18 to the air cooling system 8.

The temperature of the primary liquid cooling system would therefore increase and the amount of heat transferred from the primary liquid cooling system 18 to the secondary liquid cooling system 6 would also increase. This will be discussed further below with reference to FIG. 4.

As described above a further deposit sensor 14B may be configured to transmit a signal 12B that is indicative of deposits 40 in the primary liquid cooling system 18 to the controller 2.

In further embodiments the signal 12B from the further deposit sensor 14B can be used by the control circuitry of the controller 12 instead of or in addition to the signal 12A received from the deposit sensor 14A to control the amount of cooling of the primary liquid cooling system 18 provided by the air cooling system 8.

Figure 4:
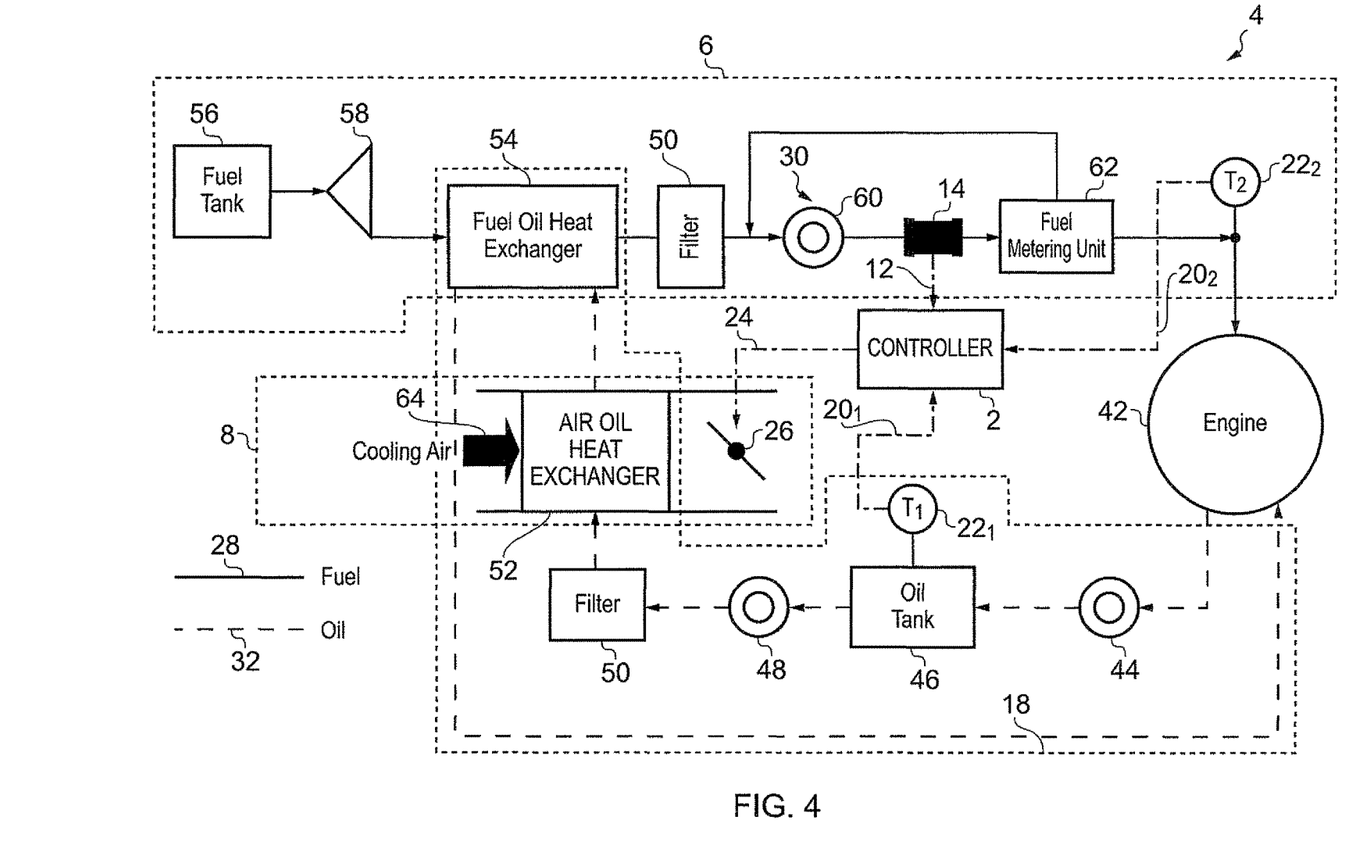
FIG. 4 illustrates a further schematic example of at least part of a power plant.

FIG. 4 illustrates a schematic example of at least part of a power plant 4 similar to those illustrated in FIGS. 2 and 3 above, however, greater detail of the primary liquid cooling system 18, the secondary liquid cooling system 6 and the air cooling system 8 is illustrated in FIG. 4. The primary liquid cooling system 18, the secondary liquid cooling system 6 and the air cooling system 8 may have any number of further elements not illustrated in FIG. 4.

The one or more inputs 10 and control circuitry, for example one or more processors 16, of the controller 2 are not illustrated in FIG. 4.

In the example illustrated in FIG. 4, the liquid in the primary liquid cooling system 18 is comprised substantially of oil 32 and the liquid in the secondary liquid cooling system 6 is comprised substantially of fuel 28 for the power plant 4. The air cooling system 8 makes use of cooling air 64 to cool the oil 32 of the primary liquid cooling system 18.

The power plant 4 comprises one or more temperature sensors $22_n$. In the illustrated example the power plant 4 comprises two temperature sensors $22_1$ and $22_2$, however the power plant 4 may contain any number of further temperature sensors.

The primary liquid cooling system 18, in the example illustrated in FIG. 4, is a circuit comprising in series an output from the engine 42, scavenger oil pumps 44, an oil tank 46, a temperature sensor $22_1$, an oil feed pump 48, a filter 50, an air oil heat exchanger 52, a fuel oil heat exchanger 54 and a return path to the engine 42.

The secondary liquid cooling system 6, in the example illustrated in FIG. 4, comprises in series a fuel tank 56, a low pressure pump 58, the fuel oil heat exchanger 54, a filter 50, a high pressure pump 60, a fuel metering unit 62 and a temperature sensor $22_2$. The high pressure pump 60 and the fuel metering unit 62 form part of a high pressure fuel system 30.

The air cooling system 8, in the example illustrated in FIG. 4, comprises the air oil heat exchanger 52 and a valve 26 for controlling the amount of cooling air 64 used in the air oil heat exchanger 52.

The flow of oil 32 around the primary liquid cooling system 18 and the flow of fuel 28 through the secondary liquid cooling system 6 are illustrated by the dashed arrows and solid arrows of FIG. 4 respectively.

The oil 32 passes through the engine 42 of the power plant 4 and is circulated around the primary liquid cooling system 32. Heat is generated during operation of the engine 42 and is transferred from the engine 42 to the oil 32 of the primary liquid cooling system 18 as the oil 32 passes through the engine 42.

The fuel 28 flows from the fuel tank 56, through the secondary liquid cooling system 6, to the engine 42 where it is used in the engine 42.

Heat may be transferred from the oil 32 of the primary liquid cooling system 18 to the fuel 28 of the secondary liquid cooling system 6 at the fuel oil heat exchanger 54. Heat may also be transferred from the oil 32 of the primary liquid cooling system 18 to the cooling air 64 at the air oil heat exchanger 52.

The valve 26, is controlled by the controller 2 to vary the amount of cooling air 64 used in the air oil heat exchanger 52 and therefore to vary the amount of heat transferred from the oil 32 of the primary liquid cooling system 18 to the cooling air 64 of the air cooling system 8. The valve 26 may be an on/off type of valve or may be modulated to provide varying amounts of cooling air 64.

As described above in relation to FIG. 3 the amount of heat transferred to the fuel 28 of the secondary liquid cooling system 6 is carefully managed to avoid overheating of the fuel 28.

The secondary liquid cooling system 6 illustrated in FIG. 4 comprises a temperature sensor $22_2$ which is configured to transmit a signal $20_2$ that is indicative of the temperature of the liquid in the secondary liquid cooling system 6 to the controller 2.

The controller 2 is configured to receive the signal $20_2$ from the temperature sensor $22_2$, which in the illustrated example, indicates the temperature of the fuel 28. The controller 2 is configured to process the signal $20_2$ received from the temperature sensor $22_2$ to control the air cooling system 8.

For example, a control temperature Tc may be set with regard to the liquid in the secondary liquid cooling system 6, in this example fuel 28. An example of a suitable control temperature for the fuel 28 is 100° C.

The controller 2 may process the signal $20_2$ received from the temperature sensor $22_2$ to control the air cooling system 8 in dependence upon a difference between the temperature of the liquid in the secondary liquid cooling system 6 and the control temperature Tc.

For example, the controller 2 may be configured to increase or decrease the amount of cooling air 64 used in the air oil heat exchanger 64. The controller 2 may be configured to transmit a signal 24 to the valve 26 to control the amount of cooling air 64 used.

The controller 2 may increase the amount of cooling air 64 used if the temperature of the fuel 28 is above the control temperature Tc to prevent degradation of the fuel 28. The controller may also decrease the amount of cooling air 64 used if the temperature of the fuel 28 is below the control temperature Tc as it may be beneficial to minimize the amount of cooling air 64 used. This will be discussed in greater detail below.

However, the control temperature Tc that is set, for example at manufacture of the powerplant, for the liquid in the secondary liquid cooling system 6 may not be suitable for all usage of the power plant 4. For example, the thermal stability of fuel 28 can vary depending on the supplier, the supplier global location and/or the presence of contaminants in the fuel such as copper.

If the control temperature Tc is set to protect the fuel system, for example, for the worst fuel quality possible this may mean that the control temperature is not optimal when better quality fuel 28 is used.

In FIG. 4 a deposit sensor 14 is located in the high pressure fuel system 30 of the secondary liquid cooling system 6. The deposit sensor 14 is configured to transmit a signal 12, to the controller 2, indicative of deposits 40 in the secondary liquid cooling system 6 as previously described.

If the signal 12 indicates that the amount and/or rate of deposition of deposits 40 in the secondary liquid cooling system 6 is greater than expected the controller 2 may reduce the control temperature Tc. This may then cause an increase in the amount of cooling air 64 used such that the temperature of the fuel 28 is decreased.

Additionally, if the signal 12 indicates that the amount and/or rate of deposition of deposits 40 in the secondary liquid cooling system 6 is less than expected the controller 2 may increase the control temperature Tc, which may cause a decrease in the amount of cooling air 64 used.

That is, the controller 2 may process the signal 12 received from the deposit sensor 14 to set the control temperature Tc of the liquid in the secondary liquid cooling system 6. The air cooling system may then be controlled in dependence upon the control temperature Tc.

As noted above the power plant 4 may be a gas turbine. In this embodiment the cooling air 64 is taken from the bypass air passing through the gas turbine during operation of the gas turbine.

This embodiment is an example of when it may be beneficial to minimize the amount of cooling air 64 used as using air for cooling purposes means that this air is not available to generate thrust, for example. In addition, the use of cooling air 64 reduces the engine thermal efficiency due to the loss of heat from the engine cycle.

As noted above, overheating of the fuel 28 can cause malfunction of the fuel system. In the embodiment of a gas turbine used in aerospace a build-up of deposits 40 in the fuel system can lead to, for example, a loss of thrust control, a loss of thrust or a loss of thrust response which may be extremely dangerous.

However, heating the fuel 28 is important as this protects against fuel borne ice contamination, which can be problematic in the aerospace aspects of gas turbines, for example.

In embodiments where the power plant is a gas turbine it is therefore important that the temperature of the fuel 28 is carefully managed. If the control temperature Tc of the secondary liquid cooling system 6, which in this case is the fuel system of the gas turbine, is designed to protect the fuel system for the worst fuel quality and temperature exposure that the gas turbine could experience then gas turbines that are exposed to less harsh conditions will incur unnecessary performance penalties due to the unnecessary use of the cooling air 64.

If the control temperature Tc is set for better conditions than the gas turbine is exposed to then this may lead to the serious consequences described above or, as a further example, the requirement of unscheduled maintenance of the gas turbine which would also be problematic.

As previously noted, the above requirement to control carefully the temperature of the liquid in the liquid cooling system or systems of a power plant 4 may also apply to embodiments where the power plant is not a gas turbine or is a gas turbine used for something other than aerospace purposes.

Returning to the example illustrated in FIG. 4, the use of the deposit sensor 14 allows a direct indication of the deposits 40 in the secondary liquid cooling system 6 to be obtained and the control temperature Tc to be adjusted accordingly and/or the air cooling system 8 to be controlled as required. This allows the amount of cooling air 64 used to be optimized.

Embodiments therefore provide an adaptive control system for a power plant heat management system that may minimize the amount of cooling air 64 depending on the condition of a liquid cooling system or systems as indicated by a deposit sensor or sensors 14A 14B.

In the example illustrated in FIG. 4 the deposit sensor 14 is located in the high pressure fuel system 30 of the power plant 4. This is typically the hottest part of the fuel system and therefore one of the parts of the system that is most vulnerable to deposition and build-up of deposits 40. In addition, in FIG. 4, the deposit sensor 14 is located before the fuel metering unit 62 as this may be the most vulnerable part of the system.

However, taking the example where the power plant 4 is a gas turbine, the deposit sensor could be located next to the fuel spray nozzles as these are also a vulnerable part of the fuel system of a gas turbine. There may be deposit sensors 14 located at both the fuel metering unit 62 and the fuel spray nozzles.

More generally, as an addition or an alternative, deposit sensors 14 may be positioned at other points in the liquid cooling system 6 which may be a secondary liquid cooling system as illustrated in FIG. 4.

In FIG. 4 the primary liquid cooling system 18 also comprises a temperature sensor $22_1$. A control temperature Tc may also be set for the liquid in the primary liquid cooling system 18. The control temperature Tc of the primary liquid cooling system 18 may be controlled in dependence upon a signal from a deposit sensor located in the primary liquid cooling system 18 in the same way as has been described above with regard to the secondary liquid cooling system 6.

The control temperature Tc of the primary liquid cooling system 18 may be different than that of the secondary liquid cooling system 6 or the control temperatures Tc of the two systems may be the same.

In the example illustrated in FIG. 4 the liquid in the primary liquid cooling system 18 is oil 32 and the signal 12 transmitted by the deposit sensor 14 located in the primary liquid cooling system 18 may be indicative of the amount or rate of deposition of deposits 40 such as coke.

Embodiments may therefore automatically apply the optimum level of cooling air 64 to maintain the oil quality at an acceptable level. This would take into account of, for example, the different oil brands, oil types, the presence of any contaminants, the temperature exposure and the type of operation of the power plant 4.

In embodiments there may be one or more deposit sensors 14 located in the secondary liquid cooling system and/or the primary liquid cooling system 6 and/or further cooling systems of the power plant 4. The controller 2 may be configured to control the air cooling system 8 in dependence upon the signals received from one or more of the deposit sensors 14 in one or more of the cooling systems.

FIG. 5A illustrates an example of a deposit sensor 14 that may be used in the embodiments described with reference to FIGS. 2, 3 and 4 or other embodiments.

The deposit sensor illustrated in FIG. 5A is an example of a photonic deposit sensor. It comprises a light source 34, configured to produce light 38, and a sensor 36. The sensor 36 may, for example, be a photocell that is configured to change its electrical resistance in dependence upon the amount of light received at the photocell. As a further example, the sensor 36 may be a photo voltaic device configured to produce a voltage according to the amount or type of light received at the photo voltaic device.

The light 38 produced by the light source 34 may be at optical wavelengths or at wavelengths other than optical wavelengths.

In the illustrated example, the light source 34 and sensor 36 are positioned either side of a fuel pipe 66 that is configured to allow fuel 28 to flow through it. A build up of deposits 40 is illustrated in the example shown in FIG. 5A.

If deposits 40 are present in the fuel pipe 66 the deposits may partially or fully cover the light sensor 34. In the illustrated example the deposits 40 are partially covering the light source 34. The deposits 34 may reduce the amount of light 38 that reaches the sensor 36 and therefore may affect the output from the sensor 36.

Figure 5B:
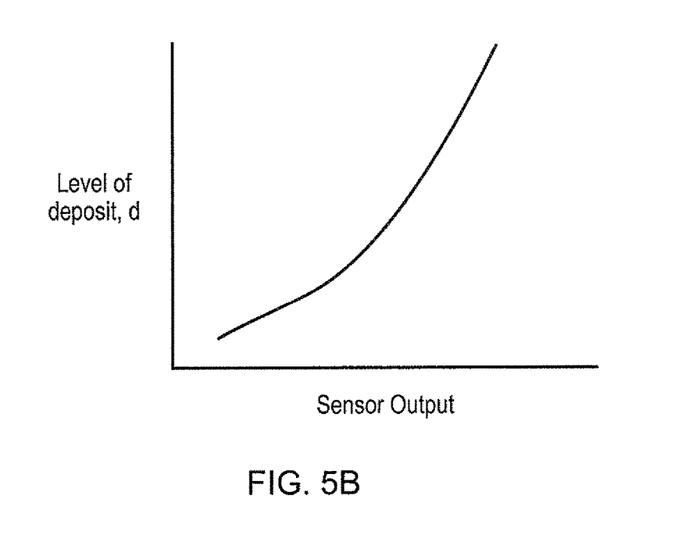
FIG. 5B illustrates an example of the output of a deposit sensor.

An example of a typical output from the sensor 36 is illustrated in FIG. 5B. As illustrated in FIG. 5B the sensor output varies with the level of deposits, d, present. In the embodiment where the sensor is a photocell the sensor output may be the resistance of the photocell.

In FIG. 5B the sensor output is therefore indicative of the amount of deposits 40 that are present in the liquid cooling system for example. The sensor output may be used by the controller 2 to control the air cooling system 8.

In general, embodiments use a deposit sensor 14 to detect the amount and/or the rate of deposition of deposits 40 present in a liquid cooling system 6, which may be a fuel system for example. Any form of deposit sensor 14 that is suitable for providing a signal 12 indicative of deposits in a liquid cooling system 6 may be used.

For example, the deposit sensor 14 may comprise a light source 34 and sensor 36 arranged in a transmission configuration as illustrated in FIG. 5A or in a reflection configuration. The deposit sensor 14 may also comprise a sensor that changes its electrical characteristics, for example capacitance, with the accumulation of deposits 40.

Additionally or alternatively, the sensor 36 may be configured to transmit a signal 12 to the controller 2 such that the controller 2 may determine the nature of the deposits 40 present by, for example, analyzing the spectrum of the light received at the sensor 36.

Knowledge of the nature of the deposits 40 may be beneficial as one type of deposit 40 may be more dangerous for the liquid cooling system 6 than another type of deposit 40. For example, a powdery type deposit may not be as serious as a tar like deposit.

The controller 2 may be configured to control the air cooling system in dependence upon the nature of the deposits 40 instead of or in combination with the amount and/or rate of deposition of deposits 40.

Embodiments may also use a sensor that is sensitive to the quality of the liquid in the liquid cooling system 6, for example an oil quality sensor.

Figure 6:
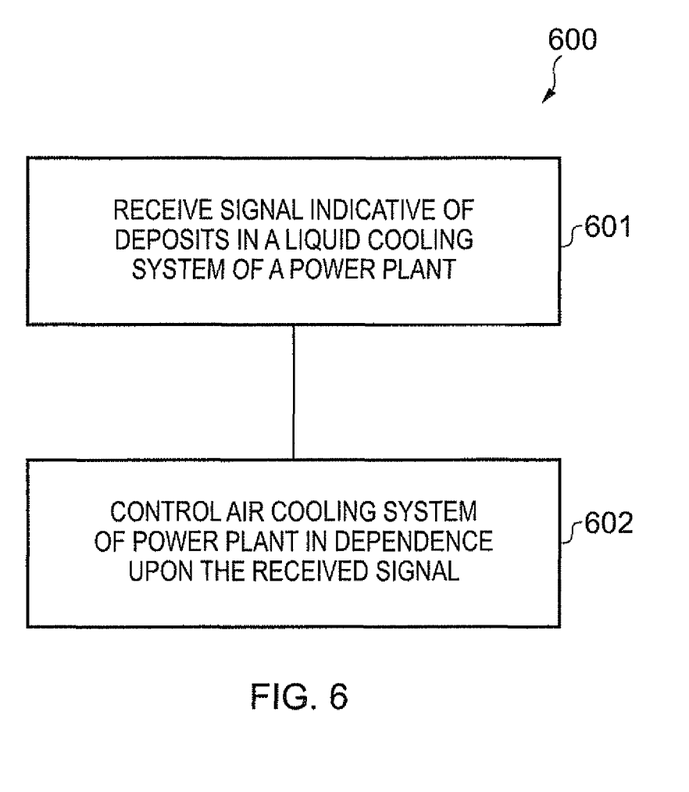
FIG. 6 illustrates a method for cooling a power plant.

FIG. 6 illustrates a method 600 for cooling a power plant 4. The method illustrated in FIG. 6 may be carried out, for example, by the controller 2 of a power plant 4.

At block 601 a signal 12 is received that is indicative of deposits 40 in a liquid cooling system 6 of a power plant 4. The signal 12 may, for example, be indicative of the amount of deposits 40 in the liquid cooling system 6 and/or the rate of deposition of deposits 40 in the liquid cooling system 6.

At block 602 an air cooling system 8 of the power plant 4 is controlled in dependence upon the received signal 12. Controlling the air cooling system 8 may comprise, for example, increasing or decreasing the amount of cooling air 64 used in the air cooling system 8 and/or setting a control temperature Tc for the liquid cooling system 6.

Figure 7:
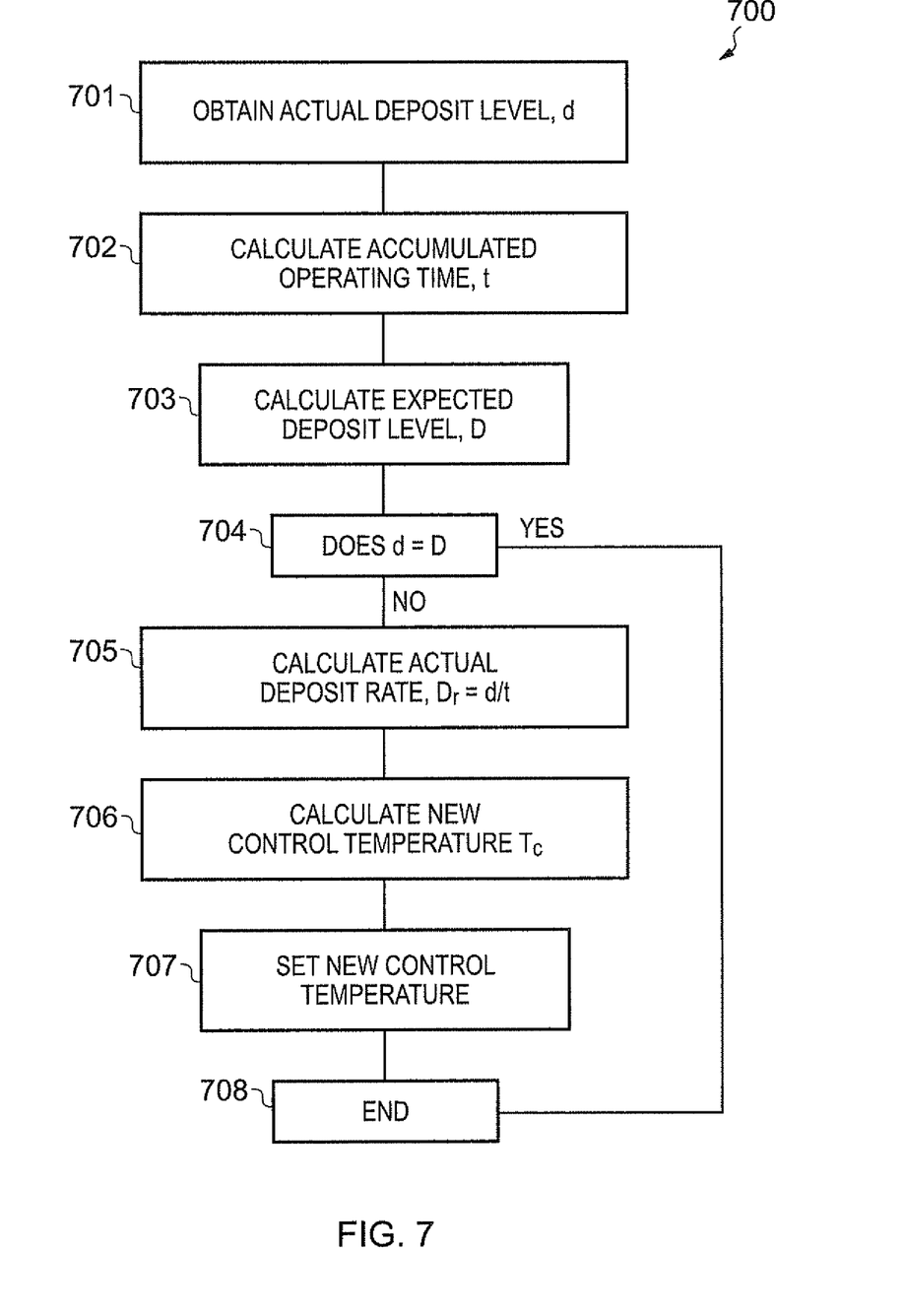
FIG. 7 illustrates a method for cooling a power plant.

FIG. 7 illustrates a more detailed method 700 for cooling a power plant. The method illustrated in FIG. 7 may be carried out, for example, by the controller 2 of a power plant 4.

At block 701 the actual level of deposits, d, in a liquid cooling system 6 is obtained. This may be achieved using the signal 12 from a deposit sensor 14 illustrated in FIG. 5A and a look-up table based on the plot as illustrated in FIG. 5B for example.

At block 702 the accumulated operating time, t, of the power plant is calculated. This may be calculated from manufacture of the power plant 4 or from the time of the last service of the liquid cooling system 6.

Deposits 40 will accumulate in the liquid cooling system 6 over time during the normal operation of the power plant 4. At block 703 the expected deposit level, D, for the accumulated operating time, t, is calculated.

Figure 8A:
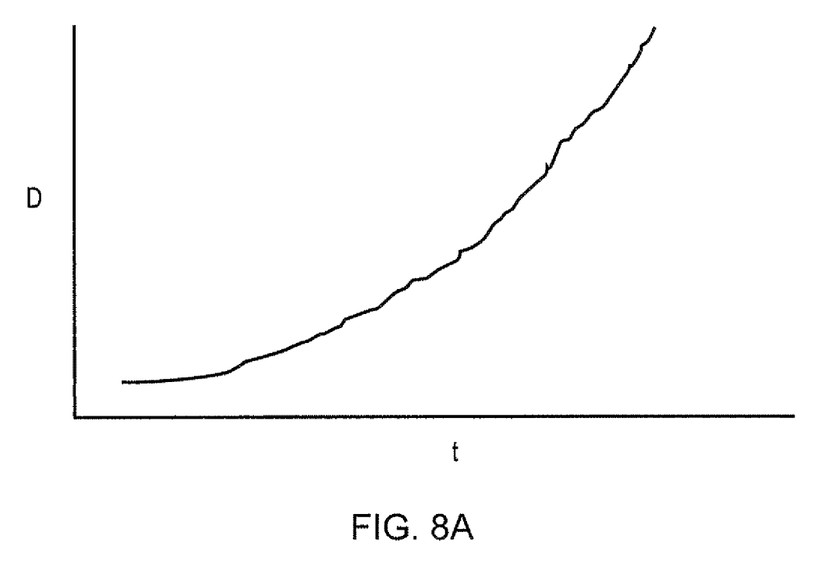
FIG. 8A illustrates an example of a relationship between accumulated operating time and expected deposit level.

The expected deposit level, D, may be calculated using an expected trend between accumulated operating time and deposit level. An example of an expected trend between accumulated operating time, t, and expected deposit level, D, is illustrated in FIG. 8A.

At block 704 the actual deposit level, d, is compared with the expected deposit level, D. If the actual deposit level, d, is equal to the expected deposit level, D, within an acceptable level of tolerance, the method proceeds to block 708 and ends.

However, if the actual deposit level, d, is not equal to the expected deposit level the method proceeds to block 705. At block 705 the actual deposit rate $D_r$ is calculated. The actual deposit rate $D_r$ is equal to the actual deposit level, d, divided by the accumulated operating time, t.

Figure 8B:
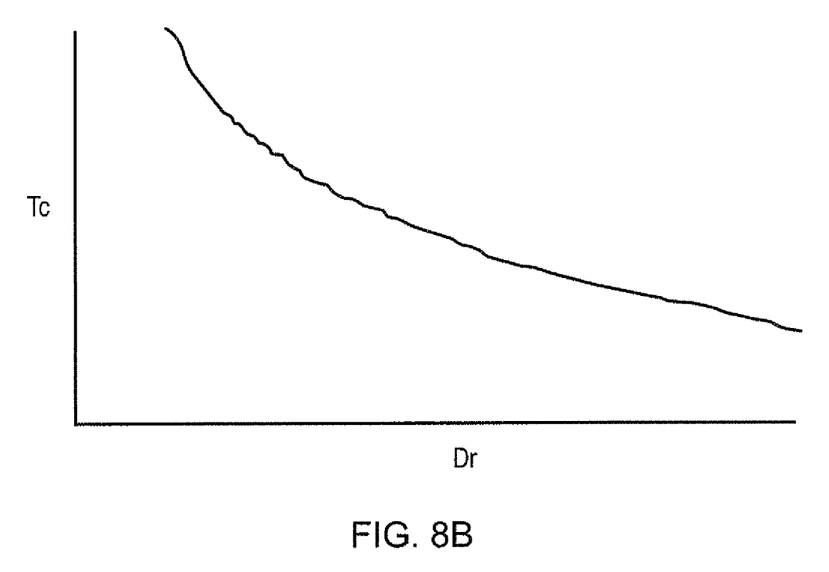
FIG. 8B illustrates an example of a relationship between actual deposit rate and control temperature.

At block 706 a new control temperature Tc, for a liquid cooling system 6 of the power plant 4, is calculated on the basis of the actual deposit rate $D_r$. The new control temperature Tc may be calculated using a relationship between the actual deposit rate $D_r$ and the suitable control temperature Tc. An exemplary relationship between $D_r$ and Tc is illustrated in FIG. 8B.

At block 707 the new control temperature Tc for the liquid cooling system 6 of the power plant 4 is set. The method then ends at block 708.

A maximum and minimum Tc may be set. For example, in the embodiment where the liquid in the liquid cooling system is fuel 28 the maximum temperature level that the fuel system would be allowed to operate at may be based on the expected rate of degradation that would be produced with the highest quality fuel 28 that is typically available for use in the power plant 4 and the intended life of the fuel system components.

Similarly, the minimum temperature level may be set at a level that would not produce excessive deposits with the lowest quality fuel 28 that is available and the intended life of the fuel system component.

Similar factors may be taken into account if the liquid in the liquid cooling system is oil 32.

The trends illustrated in FIGS. 8A and 8B may be calculated on the basis of different factors. For example, the trends may take into account the type and/or quality of the liquid in the liquid cooling system 6, which may be fuel 28 or oil 32. They may also take into account the operating conditions of the power plant 4 such as the ambient conditions (for example temperature) at the area of operation of a gas turbine aero engine.

The signal from the deposit sensor or sensors 14 may, for example, be monitored continuously such that the air control system 8 is controlled continuously which may comprise updating the control temperature Tc continuously.

Alternatively, the signal from the deposit sensor or sensors 14 may be monitored after a specified interval, for example every minute, every 5 minutes, every hour, once a day, once a week and so on. The air control system 8 may then be controlled to have a particular airflow at those specified intervals.

In the embodiment where the power plant 4 is a gas turbine used in aerospace, the signal from the deposit sensor or sensors 14 may be monitored once per flight, for example.

The presence of a deposit sensor or sensors 14 in the liquid cooling system or systems 6, 18 of a power plant 4 may also allow additional health checks to be carried out on the power plant 4 at any time. The deposit sensor or sensors 14 may provide a direct indication of the level of any thermal degradation product deposits, for example, without having to physically inspect the components of the liquid cooling system or systems 6, 18. This would be advantageous for the maintenance of the power plant 4.

Figure 9:
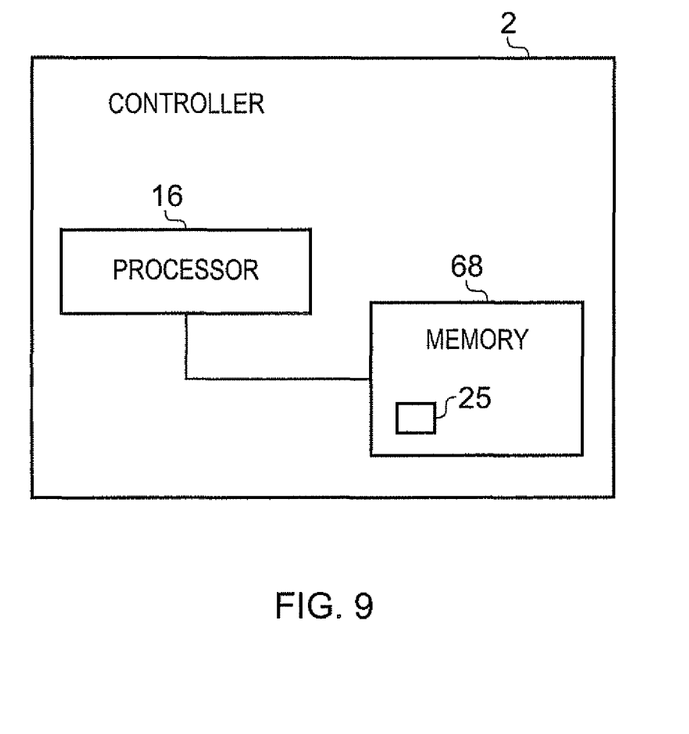
FIG. 9 illustrates an example of a controller.

FIG. 9 illustrates an example of a controller 2 comprising control circuitry, for example one or more processors 16, and a memory 68. The memory 68 may be any suitable computer readable storage medium and stores a computer program 25. Only a single processor 16 is illustrated in FIG. 9.

The controller 2 may be implemented using instructions that enable hardware functionality, for example, by using executable computer program instructions in a general-purpose or special-purpose processor that may be stored on a computer readable storage medium (disk, memory etc) to be executed by such a processor 16.

The processor 16 is configured to read from and write to the memory 68. The memory 68 stores a computer program 25 comprising computer program instructions that control the operation of the controller 2 when loaded into the processor 16. The computer program instructions 25 provide the logic and routines that enables the apparatus to perform the methods illustrated in FIGS. 6 and 7. The processor 16 by reading the memory 68 is able to load and execute the computer program 25.

The computer program 25 may arrive at the controller 2 via any suitable delivery mechanism. The delivery mechanism may be, for example, a computer-readable storage medium, a computer program product, a memory device, a record medium such as a compact disc read-only memory (CD-ROM) or digital versatile disc (DVD), an article of manufacture that tangibly embodies the computer program 25. The delivery mechanism may be a signal configured to reliably transfer the computer program 25.

The blocks illustrated in the FIGS. 6 and 7 may represent steps in a method and/or sections of code in the computer program 25. The illustration of a particular order to the blocks does not necessarily imply that there is a required or preferred order for the blocks and the order and arrangement of the block may be varied. Furthermore, it may be possible for some steps to be omitted.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Features of the controller, power plant, gas turbine power plant, method of cooling a power plant and computer program of the present disclosure are defined in the following paragraphs.

1 A controller, for use in a power plant having a liquid cooling system and an air cooling system, comprising:
  one or more inputs, configured to receive a signal from at least one deposit sensor, wherein the signal from the deposit sensor is indicative of deposits in the liquid cooling system; and
  one or more processors, configured to process the signal received from the deposit sensor to control the air cooling system.

2 A controller as described in paragraph 1, wherein the signal from the at least one deposit sensor varies with an amount of deposits in the liquid cooling system.

3 A controller as described in paragraph 1, wherein the signal from the at least one deposit sensor varies with a rate of deposition of deposits in the liquid cooling system.

4 A controller as described in any of paragraphs 1 to 3, wherein the one or more processors are further configured to process the signal received from the one or more deposit sensors to set a control temperature of the liquid cooling system.

5 A controller as described in paragraph 4, further comprising one or more inputs configured to receive a signal, from a temperature sensor, that is indicative of a temperature of the liquid cooling system, wherein the one or more processors are configured to process the signal received from the temperature sensor to control the air cooling system in dependence upon a difference between the temperature of the liquid cooling system and the control temperature.

6 A controller as described in any of paragraphs 1 to 5, wherein the one or more processors are configured to transmit a signal to operate a valve to control the air cooling system.

7 A controller as described in any of paragraphs 1 to 6, wherein the one or more inputs are further configured to receive a further signal from at least one further deposit sensor.

8 A gas turbine power plant, comprising a controller as described in any of preceding paragraphs 1 to 7.

9 A power plant comprising:
  a liquid cooling system;
  an air cooling system;
  at least one deposit sensor configured to transmit a signal that is indicative of deposits in the liquid cooling system; and
  control circuitry configured to process a signal received from the deposit sensor to control the air cooling system.

10 A power plant as described in paragraph 9, wherein the liquid in the liquid cooling system is comprised substantially of fuel for the power plant.

11 A power plant as described in paragraph 9 or 10, wherein the deposit sensor is located in a high pressure fuel system of the power plant.

12 A power plant as described in any of paragraphs 9 to 11, wherein the power plant further comprises a further liquid cooling system and wherein the liquid cooling system and the further liquid cooling system are configured such that there is heat exchange between them.

13 A power plant as described in paragraph 12, wherein the liquid in the liquid cooling system is substantially comprised of fuel for the power plant and the liquid in the further liquid cooling system is substantially comprised of oil and wherein the liquid cooling system and the further liquid cooling system are configured such that heat is exchanged from the oil liquid cooling system to the fuel liquid cooling system.

14 A power plant as described in paragraph 12 or 13, wherein the air cooling system is configured to cool the liquid in the further liquid cooling system and wherein the control circuitry is configured to control the amount of cooling of the further liquid cooling system provided by the air cooling system in dependence upon the signal received from the deposit sensor.

15 A power plant as described in paragraph 9, wherein the liquid in the liquid cooling system is comprised substantially of oil.

16 A power plant as described in any of paragraphs 9 to 15, wherein the deposit sensor comprises a light source and a sensor.

17 A power plant as described in any of paragraphs 9 to 16, wherein the deposit sensor comprises a light source and a photocell, wherein the photocell is configured to change its electrical resistance in dependence upon the amount of light received at the photocell.

18 A power plant as described in any of paragraphs 9 to 16, wherein the deposit sensor comprises a light source and a photovoltaic device, wherein the photovoltaic device is configured to produce a voltage dependent upon the amount or type of light received at the photovoltaic device.

19 A power plant as described in any of paragraphs 9 to 18, wherein the control circuitry is configured to process a further signal received from at least one further deposit sensor to control the air cooling system.

20 A power plant as described in paragraph 19 when dependent upon paragraph 12, wherein the further signal varies with an amount of deposits in the further liquid cooling system.

21 A method of cooling a power plant comprising:
receiving a signal indicative of deposits in a liquid cooling system of the power plant; and
controlling an air cooling system of the power plant in dependence upon the received signal.

22 A method as described in paragraph 21, wherein controlling the air cooling system comprises setting a control temperature for the liquid cooling system.

23 A method as described in paragraph 22, further comprising:
receiving a signal indicative of the temperature of the liquid cooling system; and
controlling the air cooling system in dependence upon a difference between the temperature of the liquid cooling system and the control temperature.

24 A method as described in any of paragraphs 21 to 23, wherein controlling the air cooling system comprises controlling the amount of air cooling of a further liquid cooling system provided by the air cooling system.

25 A computer program, that when executed by a processor performs the method of any of paragraphs 21 to 24.

The invention claimed is:

1. A controller, for use in a power plant having a liquid cooling system and an air cooling system, comprising:
one or more inputs, configured to receive a signal from at least one deposit sensor, wherein the signal from the deposit sensor is indicative of deposits in the liquid cooling system; and
one or more processors, configured to process the signal received from the deposit sensor to control the air cooling system.

2. A controller as claimed in claim 1, wherein the signal from the at least one deposit sensor varies with an amount of deposits in the liquid cooling system.

3. A controller as claimed in claim 1, wherein the signal from the at least one deposit sensor varies with a rate of deposition of deposits in the liquid cooling system.

4. A controller as claimed in claim 1, wherein the one or more processors are further configured to process the signal received from the one or more deposit sensors to set a control temperature of the liquid cooling system.

5. A controller as claimed in claim 4, further comprising one or more inputs configured to receive a signal, from a temperature sensor, that is indicative of a temperature of the liquid cooling system, wherein the one or more processors are configured to process the signal received from the temperature sensor to control the air cooling system in dependence upon a difference between the temperature of the liquid cooling system and the control temperature.

6. A controller as claimed in claim 1, wherein the one or more processors are configured to transmit a signal to operate a valve to control the air cooling system.

7. A power plant comprising:
a liquid cooling system;
an air cooling system;
at least one deposit sensor configured to transmit a signal that is indicative of deposits in the liquid cooling system; and
control circuitry configured to process a signal received from the deposit sensor to control the air cooling system.

8. A power plant as claimed in claim 7, wherein the liquid in the liquid cooling system is comprised substantially of fuel for the power plant.

9. A power plant as claimed in claim 7, wherein the power plant further comprises a further liquid cooling system and wherein the liquid cooling system and the further liquid cooling system are configured such that there is heat exchange between them.

10. A power plant as claimed in claim 9, wherein the liquid in the liquid cooling system is substantially comprised of fuel for the power plant and the liquid in the further liquid cooling system is substantially comprised of oil and wherein the liquid cooling system and the further liquid cooling system are configured such that heat is exchanged from the oil liquid cooling system to the fuel liquid cooling system.

11. A power plant as claimed in claim 9, wherein the air cooling system is configured to cool the liquid in the further liquid cooling system and wherein the control circuitry is configured to control the amount of cooling of the further liquid cooling system provided by the air cooling system in dependence upon the signal received from the deposit sensor.

12. A power plant as claimed in claim 7, wherein the deposit sensor comprises a light source and a photocell, wherein the photocell is configured to change its electrical resistance in dependence upon the amount of light received at the photocell.

13. A power plant as claimed in claim 7, wherein the deposit sensor comprises a light source and a photovoltaic device, wherein the photovoltaic device is configured to produce a voltage dependent upon the amount or type of light received at the photovoltaic device.

14. A power plant as claimed in claim 9, wherein the control circuitry is configured to process a further signal received from at least one further deposit sensor to control the air cooling system.

15. A power plant as claimed in claim 14, wherein the further signal varies with an amount of deposits in the further liquid cooling system.

16. A method of cooling a power plant comprising:
   receiving a signal indicative of deposits in a liquid cooling system of the power plant; and
   controlling an air cooling system of the power plant in dependence upon the received signal.

17. A method as claimed in claim 16, wherein controlling the air cooling system comprises setting a control temperature for the liquid cooling system.

18. A method as claimed in claim 17, further comprising:
   receiving a signal indicative of the temperature of the liquid cooling system; and
   controlling the air cooling system in dependence upon a difference between the temperature of the liquid cooling system and the control temperature.

19. A method as claimed in claim 16, wherein controlling the air cooling system comprises controlling the amount of air cooling of a further liquid cooling system provided by the air cooling system.

20. A computer program, that when executed by a processor performs the method of claim 16.

21. A power plant as claimed in claim 7, wherein the power plant is a gas turbine engine.

* * * * *

UNITED STATES PATENT AND TRADEMARK OFFICE
CERTIFICATE OF CORRECTION

PATENT NO. : 10,100,746 B2
APPLICATION NO. : 13/461325
DATED : October 16, 2018
INVENTOR(S) : Peter Frederick William Foster It is certified that error appears in the above-identified patent and that said Letters Patent is hereby corrected as shown below:

Item (75) Inventor should read: Peter Frederick William Foster

Signed and Sealed this
Eighth Day of January, 2019

Andrei Iancu
*Director of the United States Patent and Trademark Office*